(12) United States Patent
Mizuno

(10) Patent No.: US 7,153,419 B2
(45) Date of Patent: Dec. 26, 2006

(54) LIQUID TREATING DEVICE

(75) Inventor: Yuji Mizuno, Tokyo (JP)

(73) Assignee: Kabushiki Kaisha Nikuni, Kanagawa (JP)

( * ) Notice: Subject to any disclaimer, the term of this patent is extended or adjusted under 35 U.S.C. 154(b) by 0 days.

(21) Appl. No.: 11/203,591

(22) Filed: Aug. 12, 2005

(65) Prior Publication Data

US 2006/0049088 A1    Mar. 9, 2006

(30) Foreign Application Priority Data

Sep. 9, 2004    (JP)    ............................. 2004-262331

(51) Int. Cl.
*B01D 21/26*    (2006.01)

(52) U.S. Cl. ...................... 210/168; 210/171; 210/258; 210/259; 210/262; 210/512.1; 210/525; 210/526

(58) Field of Classification Search ................ 210/171, 210/512.1
See application file for complete search history.

(56) References Cited

U.S. PATENT DOCUMENTS

| 2,717,695 | A | * | 9/1955 | Martin | ....................... 209/732 |
| 2,868,695 | A | * | 1/1959 | Shea, Jr. | ........................ 201/4 |
| 2,923,151 | A | * | 2/1960 | Engle et al. | ............. 73/152.04 |
| 5,628,913 | A | * | 5/1997 | Modig | ........................ 210/770 |
| 2006/0049088 | A1 | * | 3/2006 | Mizuno | ...................... 210/171 |

FOREIGN PATENT DOCUMENTS

| JP | 11-138051 | 5/1999 |
| JP | 2003-275938 | 9/2003 |

* cited by examiner

Primary Examiner—Robert James Popovics
Assistant Examiner—T. Woodruff
(74) Attorney, Agent, or Firm—Dennis G. LaPointe

(57) ABSTRACT

A liquid treating device without any restrictions for a sludge discharge device set above a liquid tank is provided. A cyclone separator adapted to swirl liquid to subject sludge to centrifugal separation from the liquid and precipitate the sludge is connected to the circulating pump adapted to pump up liquid coolant containing the sludge discharged to a liquid tank from a machine tool. An opening/closing valve for sludge discharge is arranged at a discharge port of a sludge pot adapted to condense the sludge precipitated by the cyclone separator. A sludge discharge device to discharge only the sludge to the exterior from a sludge storage tank part adapted to store the sludge and liquid discharged from the sludge pot via the opening/closing valve temporarily is set. A supernatant liquid stored in the sludge storage tank part of the sludge discharge device in the suction side of the pump is recovered.

4 Claims, 6 Drawing Sheets

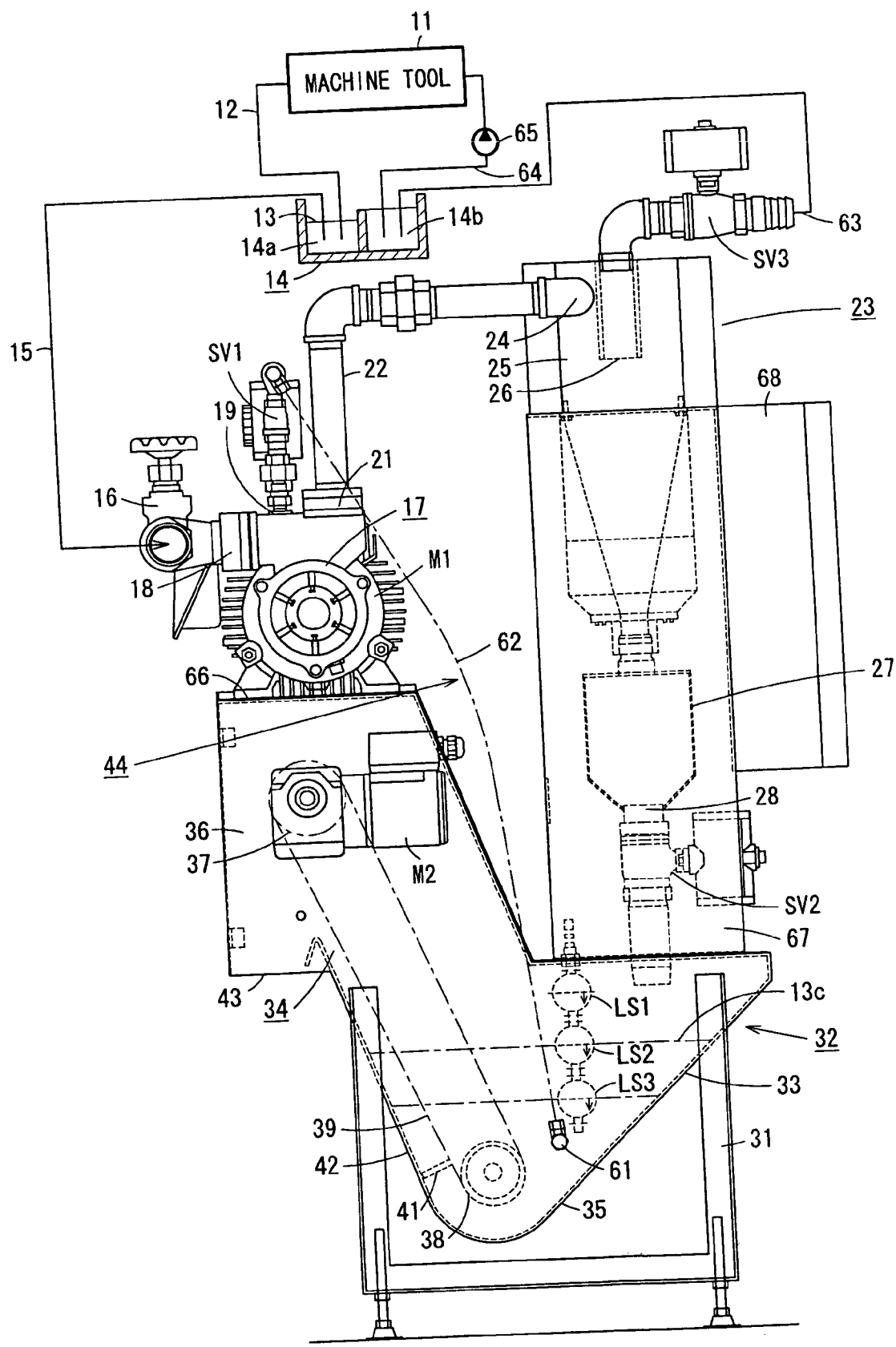
F I G. 1

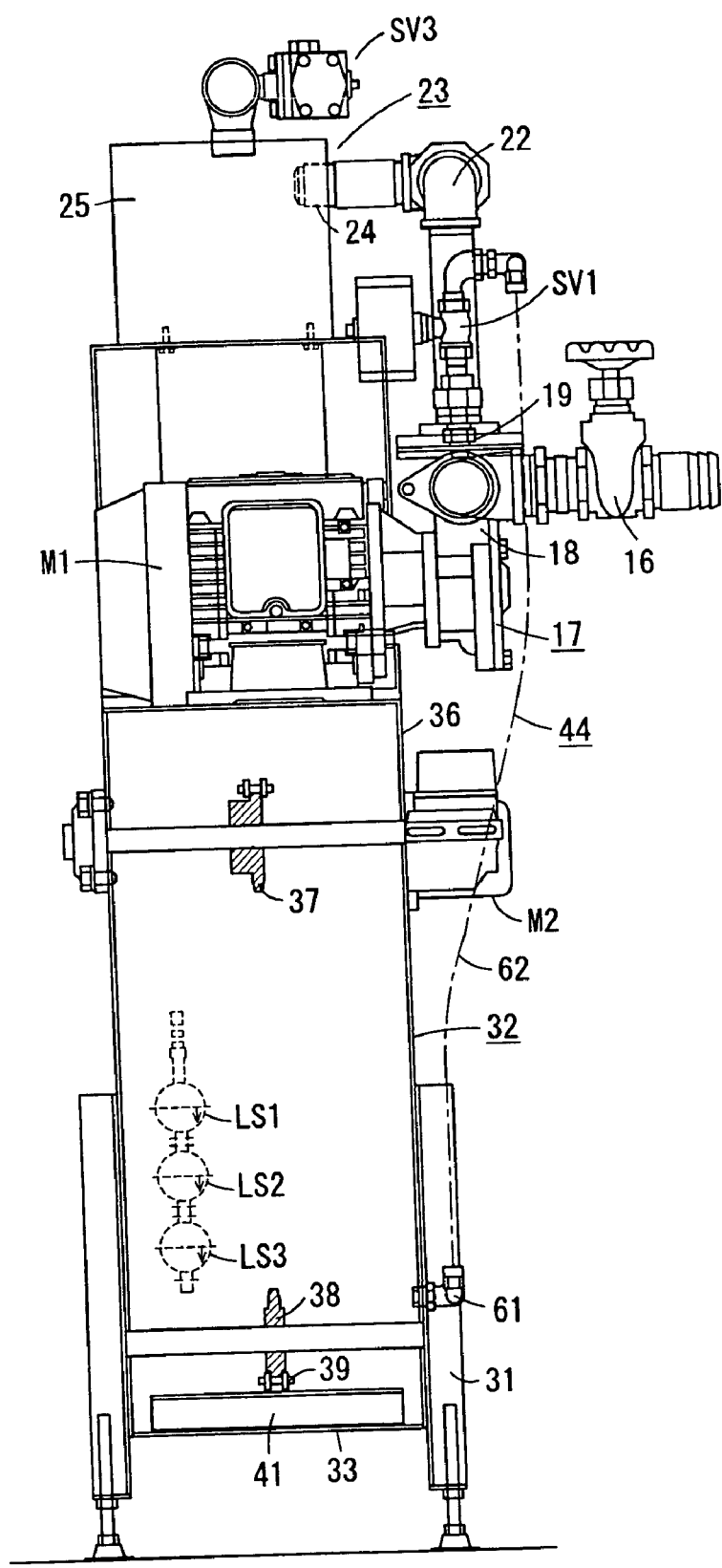
F I G. 2

LIQUID TREATING DEVICE

INCORPORATION BY REFERENCE

The present application claims priority under U.S.C. §119 to Japanese Patent Application No. 2004-262331. The content of the application is incorporated in its entirety.

FIELD OF THE INVENTION

The present invention relates to a liquid treating device for separating and removing sludge from liquid discharged from a machine tool.

BACKGROUND OF THE INVENTION

Conventionally, for example, as described in Japanese Laid-open Paten Publication No. 11-138051 (page 3, FIG. 1), a liquid treating device for separating and removing sludge from the used liquid coolant discharged from a machine tool has been known. Referring to the liquid treating device, liquid containing the sludge discharged to a liquid tank from the machine tool is pumped up by a pump and supplied to a cyclone filter. The liquid is swirled by the cyclone filter, and the sludge is subjected to centrifugal separation. Clean liquid is supplied to the machine tool, and dirty liquid containing the sludge is returned to the liquid tank.

Also, for example, Japanese Laid-open Patent Publication No. 2003-275938 (page 3, FIG. 1) discloses a coolant cleaning device. Referring to the coolant cleaning device, liquid containing sludge discharged to a liquid tank through a magnetic separator from the machine tool is pumped up by a pump, and is supplied to a cyclone device. The liquid is swirled by the cyclone device, and the sludge is subjected to centrifugal separation from the liquid. Clean liquid is supplied to a clean tank, and dirty liquid containing the sludge is circulated in the liquid tank through a sludge precipitation tank and a magnetic separator.

Since the liquid treating device described in Japanese Laid-open Patent Publication No. 11-138051 returns the dirty liquid containing the sludge to the liquid tank, a problem exists in that the sludge is not discharged to the exterior of a liquid circulatory system.

The coolant cleaning device described in Japanese Published Unexamined Patent Application No. 2003-275938 can discharge the sludge to the exterior of the liquid circulatory system, and the dirty liquid containing the sludge discharged from the lower part of the cyclone device is dropped to the sludge precipitation tank, and is treated. The liquid overflowed from the sludge precipitation tank is dropped to the magnetic separator, and is processed. The liquid dropped from the magnetic separator is further collected in the liquid tank. The treated liquid is sequentially descended, and thereby, sludge discharge devices such as the sludge precipitation tank and the magnetic separator must be set on the liquid tank being subjected to restrictions.

The present invention has been accomplished in view of the foregoing and other problems. It is an object of the present invention to provide a liquid treating device without any restrictions for a sludge discharge device that is set on a liquid tank.

SUMMARY OF THE INVENTION

The present invention provides a liquid treating device comprising: a pump adapted to pump up liquid containing sludge discharged to a liquid tank from a machine tool; a cyclone separator adapted to swirl the liquid discharged from the pump to subject the sludge to centrifugal separation from the liquid and precipitate the sludge; a sludge pot adapted to condense the sludge precipitated by the cyclone separator and discharge the precipitated sludge from a discharge port arranged in the lower part; an opening/closing valve for sludge discharge arranged at the discharge port of the sludge pot; a sludge discharge device having a sludge storage tank part adapted to store the sludge and liquid discharged from the sludge pot via the opening/closing valve temporarily, and a sludge discharge conveyor adapted to discharge only the sludge to the exterior from the sludge storage tank part; and a supernatant liquid recovering part adapted to recover a supernatant liquid stored in the sludge storage tank part of the sludge discharge device into the suction side of the pump. The sludge precipitated by the cyclone separator is condensed by the sludge pot. The opening/closing valve for sludge discharge is then opened, and the sludge is stored in the sludge storage tank part of the sludge discharge device. Accordingly, only sludge can be efficiently discharged to the exterior by the sludge discharge conveyor, and the supernatant liquid stored in the sludge storage tank part can be suppressed in a small quantity. Thereby, the supernatant liquid recovering part can recover the supernatant liquid in a short time to the suction side of the pump. At the same time, when the storing speed of the supernatant liquid in the sludge storage tank part is fast, it is necessary to overflow the supernatant liquid in the liquid tank. In that case, the sludge discharge device or the like must be set on the liquid tank. However, a liquid treating device having the sludge pots and the supernatant liquid recovering part is not restricted. The cyclone separator and the sludge discharge device or the like can be set at any place regardless of the liquid tank.

The present invention provides the liquid treating device, wherein the pump is a vortex pump including: a pump body; an impeller rotatably arranged in the pump body; a liquid suctioning port adapted to suction the liquid contained in the liquid tank into the pump body by the rotation of the impeller; a liquid discharge port adapted to discharge the liquid pressurized in the pump body by the rotation of the impeller to the exterior; and a supernatant liquid suctioning pipe inserted in the liquid suctioning port and suctioning the supernatant liquid in the pump body from the sludge storage tank part, and the supernatant liquid recovering part includes: a supernatant liquid recovery piping arranged from the inside of the sludge storage tank part of the sludge discharge device to the supernatant liquid suctioning pipe of the pump; and an opening/closing valve for supernatant liquid recovery adapted to open and close the supernatant liquid recovery piping. The supernatant liquid recovery piping is arranged from the sludge storage tank part of the sludge discharge device to the supernatant liquid suctioning pipe inserted in the liquid suctioning port of the vortex pump. The opening/closing valve for supernatant liquid recovery opens and closes the supernatant liquid recovery piping. Thereby, the common vortex pump can be effectively used as the pump for supplying the liquid in the liquid tank to the cyclone separator, and as the pump for recovering the supernatant liquid in the sludge storage tank part.

The present invention provides the liquid treating device, further comprising an opening/closing valve for pressurizing in the cyclone separator arranged in a passage for discharging the treated liquid after subjecting the sludge to centrifugal separation by the cyclone separator. The opening/closing valve for pressurizing in the cyclone separator is closed, and the opening/closing valve for sludge discharge provided at the discharge port of the sludge pot is opened. Thereby, the inside of the cyclone separator can be pressurized, and the sludge in the sludge pot can be reliably taken out by pushing out the sludge to the sludge storage tank part of the sludge discharge device.

BRIEF DESCRIPTION OF THE DRAWINGS

FIG. 1 is a front view of a liquid treating device according to an embodiment of the present invention.

FIG. 2 is a side view of the liquid treating device of which a part is cut.

DETAIL DESCRIPTION OF THE INVENTION

Figure 3:
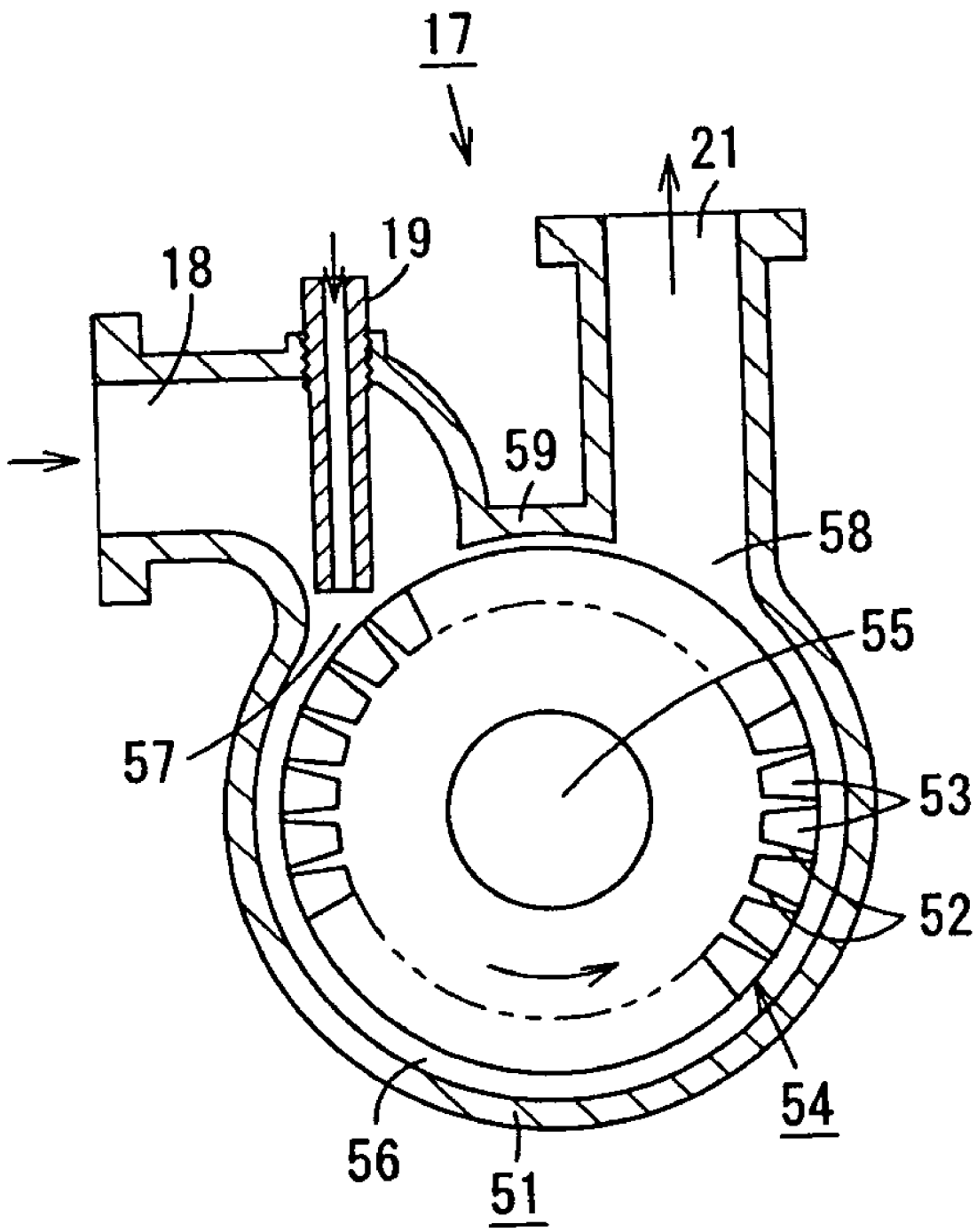
FIG. 3 is a sectional view showing a pump of the same.

Hereinafter, the present invention will be described with reference to an embodiment shown in FIG. 1 to FIG. 6.

As shown in FIG. 1, a liquid tank 14 for temporarily storing liquid coolant 13 as liquid discharged through a passage 12 from a machine tool 11 and containing sludge in a dirty tank part 14a is set. A passage 15 branching off from the dirty tank part 14a of the liquid tank 14 is connected to a liquid suctioning port 18 of a circulating pump 17 as a pump for pumping up the liquid coolant 13 via a manual opening/closing valve 16. The circulating pump 17 is driven by a motor M1, and a supernatant liquid suctioning pipe 19 opened and closed by a solenoid operated opening/closing valve SV1 is inserted in the liquid suctioning port 18 of the circulating pump 17.

A liquid introducing pipe 24 of a cyclone separator 23 is connected to a liquid discharge port 21 of the circulating pump 17 via a passage 22. The liquid introducing pipe 24 of the cyclone separator 23 is provided in a tangent line direction of a cylindrical container body 25. The liquid coolant discharged from the liquid discharge port 21 of the circulating pump 17 is swirled in the cylindrical container body 25. The sludge is subjected to centrifugal separation from the liquid coolant, and is precipitated. The liquid coolant obtained by removing the sludge from a pipe 26 inserted in the central part of the cylindrical container body 25 is taken out, and is returned to the liquid tank 14.

A sludge pot 27 is connected to the lower part of the cyclone separator 23, and the sludge precipitated by the cyclone separator 23 is condensed in the sludge pot 27, and is discharged from a lower discharge port 28. A solenoid operated opening/closing valve SV2 for sludge discharge is provided at the discharge port 28 of the sludge pot 27.

A sludge discharge device 32 having a leg frame 31 is provided under the cyclone separator 23 and the sludge pot 27. The sludge discharge device 32 has a sludge storage tank part 33 for temporarily storing the sludge and a slight amount of liquid discharged from the sludge pot 27 via the opening/closing valve SV2, and a sludge discharge conveyor 34 for discharging only the sludge to the exterior from the sludge storage tank part 33.

The sludge storage tank part 33 has a V-shaped bottom plate part 35. Limit switches LS1, LS2, and LS3 with floats for detecting the liquid level of supernatant liquid 13c are respectively provided at an upper-stage, a middle-stage and a lower-stage in the sludge storage tank part 33.

As shown also in FIG. 2, referring to the sludge discharge conveyor 34, a motor M2 is attached to a conveyor casing 36 integrally formed with the sludge storage tank part 33. A sprocket 37 rotated by the motor M2 is pivoted. On the other hand, a sprocket 38 is rotatably pivoted in the bottom part of the sludge storage tank part 33. An endless chain 39 is wound around the sprockets 37 and 38, and a sludge scraping plate 41 is attached to a part of the endless chain 39.

The endless chain 39 is arranged in an inclined form along an inclined surface 42 of the one side of the sludge storage tank part 33, and the sludge scraping plate 41 is ascended along the inclined surface 42. A sludge taking-out outlet 43 is opened downward at the upper end of the inclined surface 42.

A supernatant liquid recovering part 44 for recovering the supernatant liquid 13c stored in the sludge storage tank part 33 into the suction side of the circulating pump 17 is provided in the sludge discharge device 32.

The circulating pump 17 is a vortex pump having a structure shown in FIG. 3, and an impeller 54 in which small blades 52 and blade grooves 53 are alternately formed in a diameter direction along the outer peripheral edge in a pump body 51 is rotatably provided by a rotation shaft 55. An annular pressurizing passage 56 is formed along the impeller 54 in the pump body 51, and an inlet part 57 located at one end of the pressurizing passage 56 and an outlet part 58 located at the other end of the pressurizing passage 56 are arranged via an isolating part 59. The liquid suctioning port 18 for suctioning the liquid coolant 13 from the inside of the liquid tank 14 by the rotation of the impeller 54 is communicated with the inlet part 57 of the pressurizing passage 56. The liquid discharge port 21 for discharging the liquid coolant pressurized in the pump body 51 by the rotation of the impeller 54 to the exterior is communicated with the outlet part 58 of the pressurizing passage 56. A supernatant liquid suctioning pipe 19 for suctioning the supernatant liquid 13c into the pump body 51 from the inside of the sludge storage tank part 33 of the sludge discharge device 32 is inserted in the liquid suctioning port 18. The tip of the supernatant liquid suctioning pipe 19 is opened at the inlet part 57.

Referring to the circulating pump 17, when the rotation shaft 55 fitted to the center of the impeller 54 is rotated by the external motor M1, the small blades 52 and blade grooves 53 of the impeller 54 are rotated in the pressurizing passage 56 concentric to the impeller 54. While the liquid coolant 13 suctioned into the liquid suctioning port 18 of the pump body 51 is moved in the pressurizing passage 56 with the impeller 54, a vortex flow is generated between each blade groove 53 of the impeller 54 and the pressurizing passage 56. The liquid coolant 13 is advanced in the pressurizing passage 56 while the vortex flow is simultaneously generated in each blade groove 53. The liquid coolant 13 is pressurized as the liquid coolant 13 is advanced in the pressurizing passage 56, and is discharged from the liquid discharge port 21.

As shown in FIG. 1, referring to the supernatant liquid recovering part 44, a supernatant liquid recovery piping 62 is arranged from an elbow type pipe joint 61 provided on the side surface of the sludge storage tank part 33 of the sludge discharge device 32 to the supernatant liquid suctioning pipe 19 of the circulating pump 17. The solenoid operated opening/closing valve SV1 for supernatant liquid recovery which opens and closes the supernatant liquid recovery piping 62 is provided in the supernatant liquid recovery piping 62.

A solenoid operated opening/closing valve SV3 for pressurizing in the cyclone separator is provided at a passage 63 for discharging the treated liquid after the sludge is subjected to centrifugal separation by the cyclone separator 23. The treated liquid from the cyclone separator 23 is returned to a clean tank part 14b of the liquid tank 14 through the passage 63, and is further supplied to the machine tool by a pump 65 in a passage 64.

A pump setting surface 66 is formed at the upper end of the conveyor casing 36 of the sludge discharge device 32, and the circulating pump 17 is set on the pump setting surface 66. A mounting casing 67 is provided on the upper surface of the sludge storage tank part 33 of the sludge discharge device 32. The cyclone separator 23 and the sludge pot 27 are provided via the mounting casing 67, and a control panel 68 is set outside.

Next, the effects of the embodiment will be explained referring to FIG. 4 to FIG. 6.

Figure 4:
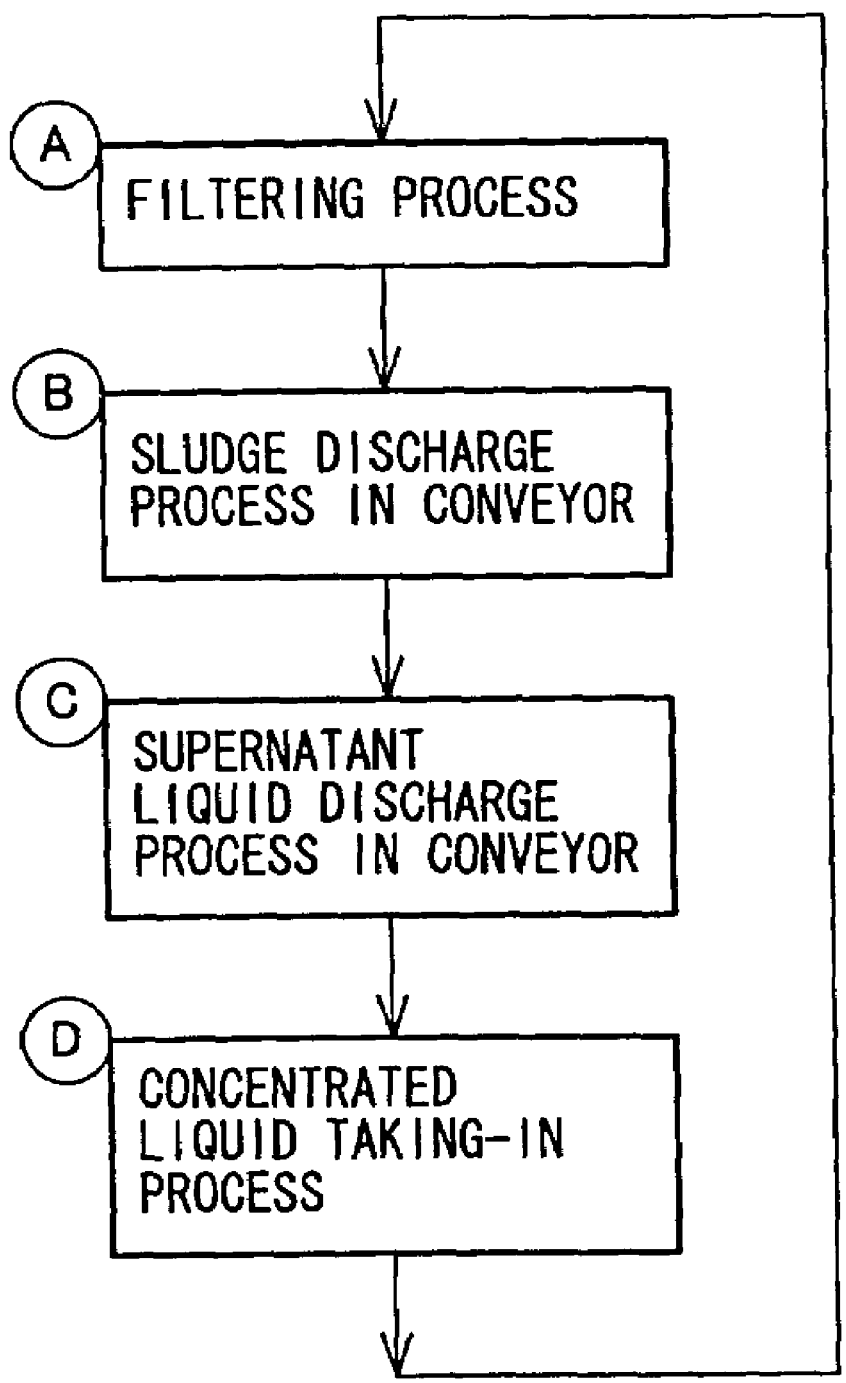
FIG. 4 is a process chart showing the action of the same.

In a filtering process A shown in FIG. 4, the opening/closing valves SV1 and SV2 are closed, and the opening/closing valve SV3 is opened. The liquid coolant 13 pumped up from the dirty tank part 14a of the liquid tank 14 by the suctioning force of the circulating pump 17 is supplied to the cyclone separator 23. The sludge in the liquid is subjected to centrifugal separation by the cyclone separator 23, and the sludge is precipitated in the lower sludge pot 27. The clean liquid after removing the sludge is returned to the clean tank part 14b of the liquid tank 14 through the passage 63, and is circulated to the machine tool 11.

When the precipitation of the sludge is advanced in the sludge pot 27, the precipitation of the sludge is also advanced in sludge storage tank part 33 of the sludge discharge device 32 simultaneously.

In a sludge discharge process B in a conveyor shown in FIG. 4, the sprocket 37 of the sludge discharge conveyor 34 is driven by the motor M2, and the endless chain 39 is driven to rotate. The sludge scraping plate 41 is ascended along the inclined surface 42 from the bottom plate part 35. Thereby the sludge stored in the bottom of the sludge storage tank part 33 is scraped along the inclined surface 42, and the scraped sludge is taken out from the sludge taking-out outlet 43 to a sludge recovery container (not shown) outside the system.

In a supernatant liquid discharge process C in a conveyor shown in FIG. 4, the opening/closing valves SV1 and SV3 are opened while the opening/closing valve SV2 is closed, and the negative pressure generated in the liquid suctioning port 18 of the circulating pump 17 is used. The supernatant liquid 13c in the sludge storage tank part 33 of the sludge discharge device 32 is discharged by suctioning the supernatant liquid 13c stored in sludge storage tank part 33 into the circulating pump 17 from the supernatant liquid suctioning pipe 19 inserted in the liquid suctioning port 18 through the supernatant liquid recovery piping 62. A suctioning pressure for suctioning the supernatant liquid 13c into the circulating pump 17 from the supernatant liquid suctioning pipe 19 is adjusted by a diaphragm of the manual opening/closing valve 16.

At this time, when the liquid coolant 13 is suctioned into the inlet part 57 of the pressurizing passage 56 from the liquid suctioning port 18 of the pump body 51, the supernatant liquid 13c in sludge storage tank part 33 of the sludge discharge device 32 is also suctioned into the inlet part 57 of the pressurizing passage 56 from the supernatant liquid suctioning pipe 19. The liquid coolant 13 and the supernatant liquid 13c are supplied to the cyclone separator 23 together.

In a concentrated liquid taking-in process D shown in FIG. 4, the opening/closing valve SV2 is opened, and the opening/closing valve SV3 is closed. The inside of the cyclone separator 23 is pressurized by the discharging pressure from the circulating pump 17, and the sludge condensed in the sludge pot 27 is discharged into sludge storage tank part 33 of the sludge discharge device 32 by the internal pressure.

The liquid coolant is filtered by repeating the processes A to D while the sludge is discharged out of the system.

Figure 5:
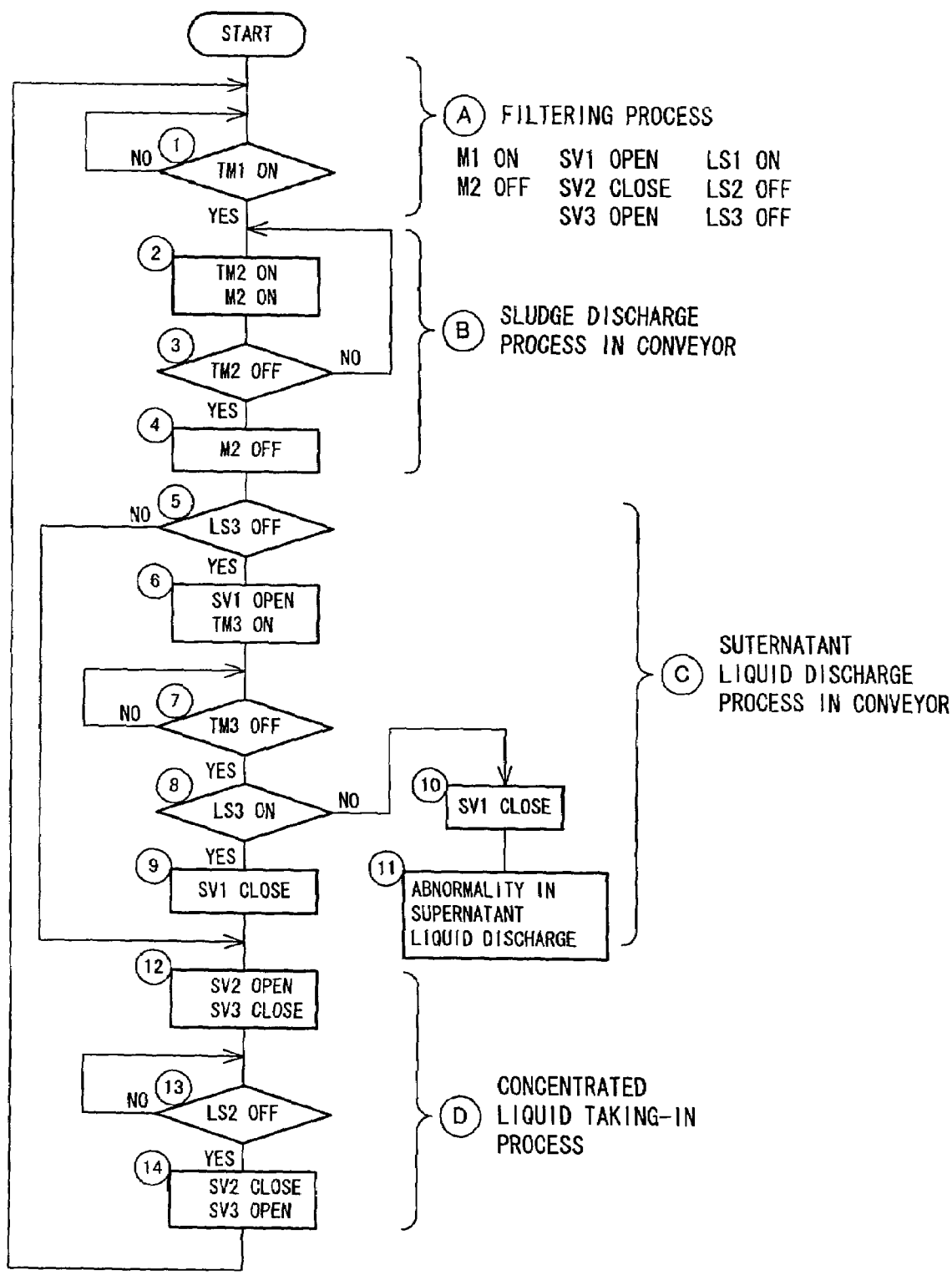
FIG. 5 is a flowchart showing the action of the same.

FIG. 5 is a flowchart showing the processes A to D shown in FIG. 4 in further detail, and the step numbers are shown by circled numbers.

(Step 1)

In the filtering process A, the motor M1 is driven, and the motor M2 is stopped. The opening/closing valves SV1 and SV2 are closed, and the opening/closing valve SV3 is opened. The limit switch LS1 with the float for overflow prevention is turned on, and the limit switches LS2 and LS3 are turned off. The filtering process is performed by the cyclone separator 23 until time TM1 set by a timer in the control panel 68 elapses.

(Steps 2 to 4)

When the time TM1 elapses, time TM2 is set by the timer. The motor M2 of the sludge discharge conveyor 34 is driven until the time TM2 elapses, and the sludge stored in the bottom of the sludge storage tank part 33 is discharged out of the system.

(Steps 5 to 9)

When the liquid surface of the supernatant liquid 13c in the sludge storage tank part 33 is located above the lowermost limit switch LS3, the limit switch LS3 is turned off. Thereby, time TM3 is set by the timer. Until the time TM3 elapses, and the limit switch LS3 is turned on, the opening/closing valve SV1 is opened, and the supernatant liquid 13c stored in the sludge storage tank part 33 of the sludge discharge device 32 is suctioned into the circulating pump 17 from the supernatant liquid suctioning pipe 19 by using the negative pressure generated in the liquid suctioning port 18 of the circulating pump 17. The supernatant liquid 13c in the sludge storage tank part 33 is discharged. If the liquid surface of the supernatant liquid 13c is descended below the lowermost limit switch LS3 and the limit switch LS3 is turned on when the time TM3 elapses, the opening/closing valve SV1 is closed.

(Steps 10 and 11)

On the other hand, even if the time TM3 elapses, the opening/closing valve SV1 is closed when the liquid surface of the supernatant liquid 13c is not descended to the lowermost limit switch LS3, and a signal for informing the abnormalities in the supernatant liquid discharge is outputted. For example, a buzzer and a warning light or the like are operated.

(Steps 12 to 14)

The opening/closing valve SV2 is opened, and the opening/closing valve SV3 is closed. The inside of the cyclone separator 23 is pressurized by the discharging pressure from the circulating pump 17, and the sludge condensed in the sludge pot 27 by the internal pressure is discharged into the sludge storage tank part 33 of the sludge discharge device 32 until the level of the limit switch LS2 is attained. When the level of the limit switch LS2 is attained, the opening/closing valve SV2 is closed, and the opening/closing valve SV3 is opened to return to the step 1.

(Steps 15 to 17)

Figure 6:
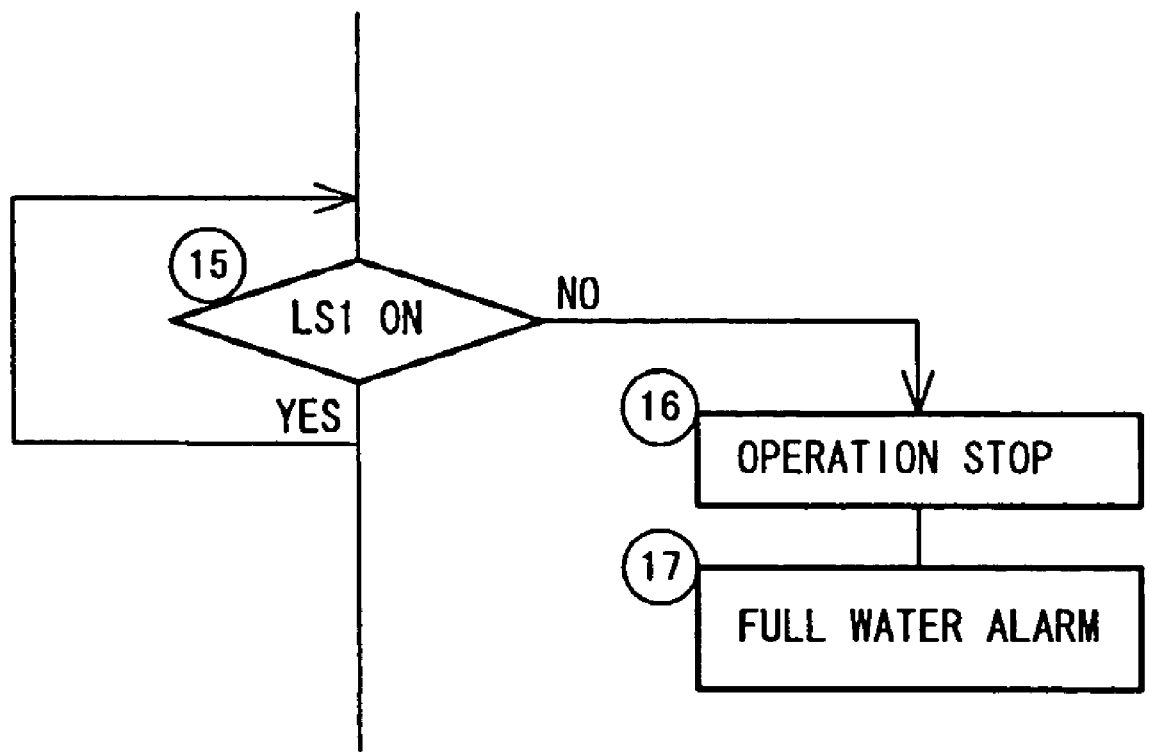
FIG. 6 is a flowchart showing the operation stop action of the same.

FIG. 6 shows a state at the time of the operation stop. Since the supernatant liquid 13c does not attain the level of the limit switch LS1 while the limit switch LS1 is turned on, the operation is continued. When the limit switch LS1 is turned off, the supernatant liquid 13c is ascended to the full water level of the limit switch LS1. Thereby, a full water alarm is operated while the operation is stopped and the overflow is prevented.

As described above, after the sludge precipitated by the cyclone separator 23 is condensed by the sludge pot 21, the opening/closing valve SV2 for sludge discharge is opened, and the condensed sludge is stored in the sludge storage tank part 33 of the sludge discharge device 32. Accordingly, only the sludge can be efficiently discharged to the exterior by the sludge discharge conveyor 34, and the supernatant liquid 13c stored in the sludge storage tank part 33 can be suppressed in a small quantity. Thereby, the supernatant liquid recovering part 44 can recover the supernatant liquid 13c to the suction side of the circulating pump 17 in a short time. At the same time, when the storing speed of the supernatant liquid 13c in the sludge storage tank part 33 is fast, it is necessary to overflow the supernatant liquid 13c in a lower liquid tank (not shown). In that case, the sludge discharge device 32 or the like must be set on the lower liquid tank. However, a liquid treating device having the sludge pots 27 and the supernatant liquid recovering part 44 is not restricted as described above. The cyclone separator 23 and the sludge discharge device 32 or the like can be set at any place regardless of the liquid tank 14.

The supernatant liquid recovery piping 62 is arranged from the inside of sludge storage tank part 33 of the sludge discharge device 32 to the supernatant liquid suctioning pipe 19 inserted in the liquid suctioning port 18 of the circulating pump 17. The supernatant liquid recovery piping 62 is opened and closed by the opening/closing valve SV1 for supernatant liquid recovery. Thereby, the common circulating pump 17 can be effectively used as the circulating pump for supplying the liquid coolant 13 in the liquid tank 14 to the cyclone separator 23, and as the recovery pump for recovering the supernatant liquid 13c in the sludge storage tank part 33.

The opening/closing valve SV3 for pressurizing in the cyclone separator is closed, and the opening/closing valve SV2 for sludge discharge provided at the discharge port 28 of the sludge pot 27 is opened. Thereby, the inside of the cyclone separator 23 can be pressurized, and the sludge in the sludge pot 27 can be reliably taken out by pushing out the sludge to the sludge storage tank part 33 of the sludge discharge device 32.

The invention claimed is:

1. A liquid treating device comprising:
a liquid tank for temporarily storing liquid containing sludge discharged from a machine tool;
a pump adapted to pump up said liquid containing sludge;
a cyclone separator adapted to swirl the liquid discharged from the pump to subject the sludge to centrifugal separation from the liquid and precipitate the sludge;
a sludge pot adapted to condense the sludge precipitated by the cyclone separator and discharge the precipitated sludge from a discharge port arranged in a lower part of the cyclone separator;
an opening/closing valve for sludge discharge arranged at the discharge port of the sludge pot;
a sludge discharge device having a sludge storage tank part adapted to store the sludge and liquid discharged from the sludge pot via the opening/closing valve temporarily, and a sludge discharge conveyor adapted to discharge only the sludge to the exterior from the sludge storage tank part; and
a supernatant liquid recovering part adapted to recover a supernatant liquid stored in the sludge storage tank part of the sludge discharge device in the suction side of the pump.

2. A liquid treating device according to claim 1, wherein the pump is a vortex pump including:
a pump body;
an impeller rotatably arranged in the pump body;
a liquid suctioning port adapted to suction the liquid contained in the liquid tank into the pump body by the rotation of the impeller;
a liquid discharge port adapted to discharge the liquid pressurized in the pump body by the rotation of the impeller to the exterior; and
a supernatant liquid suctioning pipe inserted in the liquid suctioning port for suctioning the supernatant liquid in the pump body from the sludge storage tank part, and
the supernatant liquid recovering part includes:
a supernatant liquid recovery pipe arranged from the inside of the sludge storage tank part of the sludge discharge device to the supernatant liquid suctioning pipe of the pump; and
an opening/closing valve for supernatant liquid recovery adapted to open and close the supernatant liquid recovery pipe.

3. A liquid treating device according to claim 1, further comprising an opening/closing valve for pressurizing in the cyclone separator arranged in a passage for discharging a treated liquid after subjecting the sludge to centrifugal separation by the cyclone separator.

4. A liquid treating device according to claim 2, further comprising an opening/closing valve for pressurizing in the cyclone separator arranged in a passage for discharging a treated liquid after subjecting the sludge to centrifugal separation by the cyclone separator.

* * * * *